(12) United States Patent
Huntington (10) Patent No.: US 9,037,482 B2
(45) Date of Patent: May 19, 2015

(54) METHOD AND SYSTEM FOR OPTIMIZING THE VIEWING OF ADVERTISING

(75) Inventor: Matthew Huntington, Mill Valley, CA (US)

(73) Assignee: OpenTV, Inc., San Francisco, CA (US)

( * ) Notice: Subject to any disclaimer, the term of this patent is extended or adjusted under 35 U.S.C. 154(b) by 1399 days.

(21) Appl. No.: 11/376,307

(22) Filed: Mar. 16, 2006

(65) Prior Publication Data

US 2007/0219859 A1    Sep. 20, 2007

(51) Int. Cl.
| G06Q 30/00 | (2012.01) |
|---|---|
| G06Q 30/02 | (2012.01) |
| H04N 7/16 | (2011.01) |
| H04N 21/258 | (2011.01) |
| H04N 21/44 | (2011.01) |
| H04N 21/4402 | (2011.01) |
| H04N 21/81 | (2011.01) |

(52) U.S. Cl.
CPC ............ *G06Q 30/0246* (2013.01); *G06Q 30/02* (2013.01); *G06Q 30/0267* (2013.01); *G06Q 30/0269* (2013.01); *H04N 7/165* (2013.01); *H04N 21/25866* (2013.01); *H04N 21/44016* (2013.01); *H04N 21/440245* (2013.01); *H04N 21/812* (2013.01)

(58) Field of Classification Search
CPC .......... G06Q 30/0244; G06Q 30/0272; G06Q 30/0255; G06Q 30/02
USPC ............................................ 705/14, 1, 14.43
See application file for complete search history.

(56) References Cited

U.S. PATENT DOCUMENTS

| 5,931,901 | A | * | 8/1999 | Wolfe et al. .................... 709/206 |
|---|---|---|---|---|
| 5,937,392 | A | * | 8/1999 | Alberts .......................... 705/14 |
| 6,161,127 | A | * | 12/2000 | Cezar et al. .................... 709/203 |
| 6,177,931 | B1 | * | 1/2001 | Alexander et al. .............. 725/52 |
| 6,286,005 | B1 | * | 9/2001 | Cannon .......................... 707/100 |
| 6,463,585 | B1 | * | 10/2002 | Hendricks et al. .............. 725/35 |
| 6,704,930 | B1 | * | 3/2004 | Eldering et al. ................ 725/36 |
| 6,876,974 | B1 | * | 4/2005 | Marsh et al. .................... 705/14 |
| 7,012,652 | B1 | * | 3/2006 | Weber ........................... 348/632 |
| 7,334,251 | B2 | * | 2/2008 | Rodriguez et al. .............. 725/42 |
| 7,962,604 | B1 | * | 6/2011 | Morris et al. .................. 709/224 |
| 2001/0020236 | A1 | * | 9/2001 | Cannon ............................ 707/1 |
| 2001/0034219 | A1 | * | 10/2001 | Hewitt et al. .............. 455/186.1 |
| 2002/0062481 | A1 | * | 5/2002 | Slaney et al. ................... 725/42 |
| 2002/0103698 | A1 | * | 8/2002 | Cantrell ........................ 705/14 |
| 2002/0129368 | A1 | * | 9/2002 | Schlack et al. ................. 725/46 |
| 2002/0188746 | A1 | * | 12/2002 | Drosset et al. ................ 709/231 |
| 2003/0004966 | A1 | * | 1/2003 | Bolle et al. ................. 707/104.1 |
| 2003/0093792 | A1 | * | 5/2003 | Labeeb et al. .................. 725/46 |
| 2003/0171990 | A1 | * | 9/2003 | Rao et al. ...................... 705/14 |
| 2003/0172374 | A1 | * | 9/2003 | Vinson et al. ..................... 725/9 |
| 2004/0030597 | A1 | * | 2/2004 | Bibas ............................. 705/14 |
| 2004/0078809 | A1 | * | 4/2004 | Drazin .......................... 725/34 |
| 2004/0107207 | A1 | * | 6/2004 | Kondo et al. ................. 707/102 |
| 2004/0137416 | A1 | * | 7/2004 | Ma et al. ....................... 434/365 |
| 2004/0148424 | A1 | * | 7/2004 | Berkson et al. ............... 709/236 |
| 2005/0021403 | A1 | * | 1/2005 | Ozer et al. ..................... 705/14 |
| 2005/0182676 | A1 | * | 8/2005 | Chan ............................. 705/14 |

(Continued)

*Primary Examiner* — Jacob C. Coppola (74) *Attorney, Agent, or Firm* — Schwegman Lundberg & Woessner, P.A.

(57) ABSTRACT

Disclosed are methods and systems for controlling the frequency that a user views an advertisement. In particular, the systems monitor the number of times an advertisement is played to a user. Once the advertisement has been played a predetermined number of times, the advertisement is replaced by another advertisement.

39 Claims, 6 Drawing Sheets

(56) References Cited

U.S. PATENT DOCUMENTS

| | | | |
|---|---|---|---|
| 2005/0289005 A1* | 12/2005 | Ferber et al. | 705/14 |
| 2006/0020506 A1* | 1/2006 | Axe et al. | 705/14 |
| 2006/0026062 A1* | 2/2006 | Collins | 705/14 |
| 2006/0053050 A1* | 3/2006 | Schweier | 705/14 |
| 2006/0074746 A1* | 4/2006 | Kline et al. | 705/14 |
| 2006/0294226 A1* | 12/2006 | Goulden et al. | 709/224 |
| 2007/0073583 A1* | 3/2007 | Grouf et al. | 705/14 |
| 2007/0143186 A1* | 6/2007 | Apple et al. | 705/14 |
| 2007/0174114 A1* | 7/2007 | Bigby et al. | 705/14 |
| 2007/0219859 A1* | 9/2007 | Huntington | 705/14 |
| 2008/0022302 A1* | 1/2008 | Tanaka et al. | 725/36 |

* cited by examiner

METHOD AND SYSTEM FOR OPTIMIZING THE VIEWING OF ADVERTISING

FIELD OF INVENTION

The present invention relates to optimizing the viewing of advertising. The advertisements can be played a predetermined number time or at a predetermined rate before being replaced.

BACKGROUND OF THE INVENTION

Advertising using television is well established. In the typical television advertising campaign, advertisers purchase several time slots in which to show a single advertisement. This is because at any one time only a fraction of people are watching a specific television program. Accordingly, advertisers show a single advertisement several times at different times and on different channels to increase the number of people exposed to the advertisement. In addition, the effectiveness of many advertisements increases after being exposed to a viewer on multiple occasions as the advertisement becomes engrained in the viewer's memory.

At some point, advertisements also may lose value and effect after a certain optimum number of views. Different advertisements can have different optimum number of views and the optimum number of views can vary from viewer to viewer. At the present time, advertisers have had to show their advertisements more than the optimum number of times to guarantee adequate coverage for the largest possible audience.

There is, therefore, a need for a method and system that can be used to monitor the number of times an advertisement has been viewed by specific viewers and to replace the advertisement after an optimum number of showings.

SUMMARY OF THE INVENTION

Described herein are methods and systems for controlling the frequency that a user views an advertisement. The systems monitor the number of times an advertisement is played to a user. Once the advertisement has been played a predetermined number of times, the advertisement is preferably replaced by another advertisement.

One embodiment of the invention is directed to a method for playing an advertisement an optimum number of times. The method includes playing regular programming that comprises a first advertisement, determining whether the first advertisement has been played an optimum number of times, playing the first advertisement if the first advertisement has been played less than the optimum number of times and playing a second advertisement if the first advertisement has been played an optimum number of times.

Preferably, the number of times the advertisement has played is recorded. The optimum number of times may be a viewing frequency. Preferably, the optimum number of times is dependent on the actions of a viewer watching the regular programming, dependent upon one or more viewing habits of a viewer or dependent on some other metric. Preferably, a viewer can indicate when the optimum number of times has been reached.

Preferably, the first advertisement and the second advertisement are broadcast in digital format. Preferably, the second advertisement is stored on a client device prior to playing.

Another embodiment of the invention is a system for playing an advertisement an optimum number of times. The system includes a first video source for providing a regular program and a first advertisement. Once received at a client device, the client device determines whether the first advertisement from the video source has been viewed an optimum number of times and if so, replace the first advertisement with a second advertisement when the first advertisement has been viewed an optimum number of times.

Preferably, the first video source comprises a digital broadcast source selected from the group consisting of satellite, digital cable, wireless, internet, intranet, or other broadcast source. Preferably, the first video source includes a local storage device. The second advertisement maybe provided by the first or a second video source. Preferably, the second video source includes a local storage device. Alternatively, preferably, the second advertisement is provided by the first video source.

The system records how many times the first advertisement has played on the system and the system monitors the viewing habits of a viewer to determine the optimum number of times.

Preferably, the system includes a two-way communication link to an advertising distributor. If a two-way communication link is present the second advertisement can be provided over the two-way communication link. Preferably, the advertising distributor is notified when the first advertisement has been viewed by a viewer over the communication link.

Yet another embodiment of the invention is a method of distributing advertisements to be played an optimum number of times. The method includes distributing to client devices a broadcast stream including regular programming, a primary advertisement, and an alternative advertisement. The method also includes distributing advertising information in the broadcast stream, wherein the advertising information comprises the optimum number of times to play the primary advertisement.

Preferably, the advertising information includes when the primary advertisement appears in the program, an identification of the primary advertisement and/or an identification of a product or service type described by the primary advertisement.

Another embodiment is a method for playing an advertisement at a predetermined frequency. The method includes playing regular programming that includes a first advertisement, determining whether the first advertisement should be played according to a predetermined frequency for the first advertisement, playing the first advertisement if it is determined that the first advertisement should be played according to the predetermined frequency for the first advertisement, and playing a second advertisement if it is determined that the first advertisement should not be played according to the predetermined frequency for the first advertisement.

The predetermined frequency may be a constant, dependent on the actions of a viewer watching the regular programming, dependent upon one or more viewing habits of a viewer, and/or dependent upon a user profile.

DESCRIPTION OF THE DRAWINGS

The invention can be understood by reference to the Detailed Description of the Invention when taken together with the attached drawings, wherein.

DETAILED DESCRIPTION OF THE INVENTION

Methods and systems are described for controlling the frequency that a user views an advertisement. The systems preferably monitor the number of times that an advertisement is played. Once the advertisement has been played a number of times, the advertisement is no longer played to the user. Preferably, the advertisement is replaced with another advertisement that is in a queue after a predetermined number of showings.

As used herein, an advertisement can be a specific program or all programming involving a specific product, service or other topic. Further, an advertisement is not limited to programming of merely a commercial nature, but an advertisement can also include any programming that is interjected into regular programming. For example, an advertisement can include, for example, instructions, notifications, enhanced viewing information and warnings.

Each time an advertisement is played on a system, the system records the total number of viewings until the total number of viewings is equal to the optimum number of viewings. At that point, the advertisement is replaced with an alternative advertisement.

The "optimum" number of times/viewings for an advertisement is the number of times an advertiser desires an advertisement to be played. This optimum number can be calculated for a household, a specific viewing device, a group of subscribers or for a specific viewer. In addition, the optimum number need not be a constant. For example, if a viewer is known to be in the market for a new car, the optimum number of views for a car advertisement may be increased.

The system may be able to determine different optimum numbers and keep track of different total number of viewings for different viewers on the same system by using profiles. A profile may be created based on viewer demographics such as age, income, geographic location, interests, or many other things. Alternatively, the system may be able to create profiles or enhance preexisting profiles of a specific viewer by monitoring their viewing habits. These viewing habits can include, for example, what shows that are watching, how long they press keys on a remote control and the volume of the television during viewing. The creation, distribution and storage of profiles are known in the art.

The viewer may also be able to influence the optimum number of viewings directly. This may be accomplished, for example, by hitting a specific key or keys while the advertisement is playing. If the viewer decides that he does not want to view a particular advertisement any more, the system may allow him to indicate this and the optimum number of viewings can reduced either permanently or for set period of time. This will prevent further viewings of this advertisement. Further, if a viewer indicates that he wants to view a particular advertisement again, the optimum number of viewings can be increased automatically.

The optimum number of viewings may also be influenced by a viewer's viewing habits. For example, if the system notices that a viewer changes the channel every time a certain advertisement appears, the optimum number of viewings may be decreased. In addition, the optimum number of viewings for advertisements related to this advertisement may also be decreased. Alternatively, if the system observes that a viewer watches a certain advertisement to the end, the optimum number may be left alone or even increased automatically. In another embodiment, the optimum number of viewings of one or more advertisements can be based on the type of programming the viewer watches frequently, for example.

The optimum number of viewings is not limited merely to a single maximum. For example, the optimum number of viewings may be a maximum number of viewings in a given time period. For example, the optimum number of times to show a viewer a particular advertisement may be five times a week.

A viewing frequency can also be chosen as a type of optimum number of viewings. The viewing frequency determines the frequency between viewings for a particular advertisement. For example, an advertisement can be chosen to viewed once an hour, once a day, or once a week. By decreasing the frequency, and therefore increasing the time between viewings, the advertiser may increase the impact each viewing has upon a viewer and decrease the chance that the advertisement becomes annoying to a viewer. In addition, by decreasing the frequency, and therefore decreasing the time between viewings, an advertiser may improve the chance the viewer will remember the commercial through repetitive viewings.

The optimum number of viewings may be one or zero in some circumstances. For example, if a certain household is known not to have pets, the optimum number of times to show an advertisement related to dog food may be zero.

The total number of viewings is preferably increased every time an advertisement is viewed on a client system. However, the count may not be increased when it is clear that no one is watching a television connected to the client system. For example, if a television has been on for more than three hours straight, there is a possibility that the television is not being watched and further showings of an advertisement should not be counted.

Preferably, the advertisements are delivered to a viewer in digitally compressed format. In a digital format, it is possible to transmit more than one video signal per 6 Mhz cable television channel. This allows a regular television program including, a primary advertisement, to be broadcast along with one or more alternative advertisements in a single digital channel. Alternatively, the alternative advertisement or advertisements may be broadcast to a viewer in a separate digital channel. In this embodiment, the system will tune to the other channel automatically to play the alternative advertisement.

Figure 1:
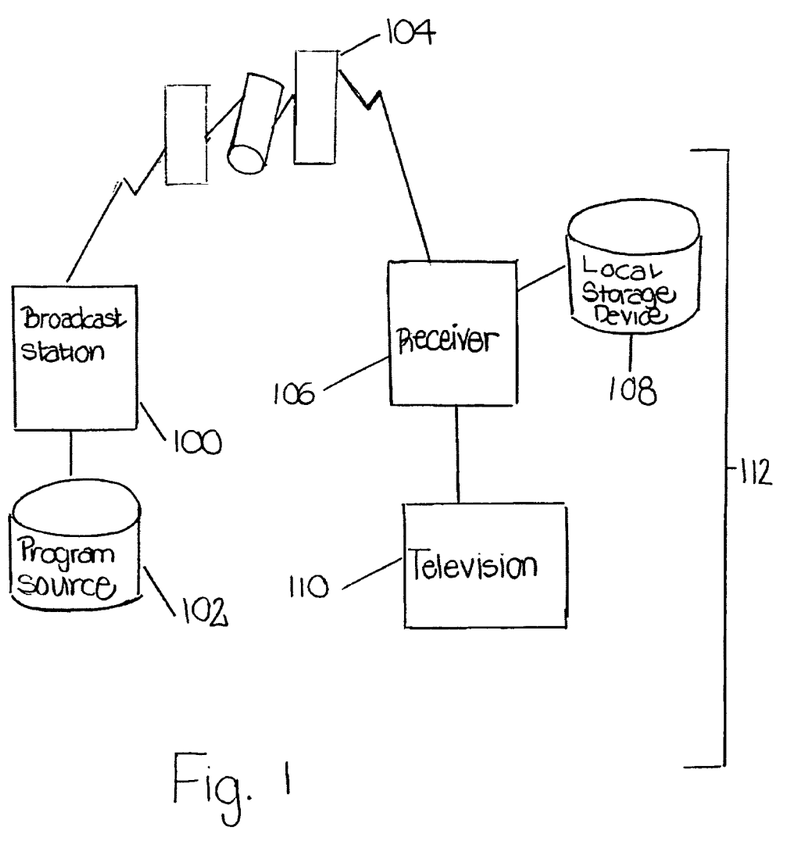
FIG. 1, is a block diagram of one embodiment of a television.

FIG. 1, is a block diagram of one embodiment of a television system. The television system generally comprises a broadcast station 100 and a client system 112. The client system 112 includes a local storage device 108 and a television 110. Local storage device 108 may comprise any suitable storage device, such as a hard disk drive, a recordable DVD drive or optical disk drive. It can be internal to the receiver 106, or it may be connected externally. A preferred type of local storage device is a personal video recorder (PVR).

In this figure, the broadcast medium 104 is depicted as a satellite transmission network. The broadcast medium 104 may, in other embodiments, comprise other transmission means such as cable, telco, fiber, wireless, power lines, and terrestrial transmission media. Broadcast station 100 is coupled to a program source 102 which is configured to provide the data which forms the program. The program source 102 could also be an operations center which broadcasts the data to a cable head-end over any conventional median or could be co-located with the broadcast station 110.

Receiving station 106 is typically implemented in a set-top box which is connected to a television 110. Alternatively, the receiver 106 could be integrated into the television. The client system 112 could also be a wired or wireless PC (or laptop)

with the computer monitor, a digital television, an analog television, a PDA, web tablet, digital radio, analog radio, cell phone, and any combination of the foregoing devices. In any event, the present invention is operable and covers without limitation any receiving apparatus known in the art.

Client system 112 incorporates a control unit (e.g., a microprocessor) a memory, and other components for selecting and decoding the received interactive television signals. Because the basic components and features of client system 112 such as set-top boxes are known, they will not be discussed in detail here.

In FIG. 1, a television advertisement is provided in a program from broadcast medium 104. Preferably, software in client system 112 counts the exposure of advertisements to viewers and stores the count in memory. Such software may be middleware and/or application software in the receiver 106. When the exposure count of an advertisement is equal to the optimum number, client system 112 replaces advertisements with either alternative advertisements broadcast in a stream from broadcast medium 104 or from local storage device 108.

In the digital television system, compression of the digital signals before broadcast allows an even larger number of video signals to be transmitted over a channel of the transmission media 104. A multiplexer combines the various digital signals into a reduced number of transmission data streams for transmission. The various NTSC television channels may be allocated in a predetermined fashion to maximize the number of simultaneously transmittable signals. The multiplexer in conjunction with the television transmission system multiplexes the desired data streams onto the desired channels, and transmits these signals over the NTSC channels. The number of video signals which may be multiplexed onto a data stream on a single transmission channel will vary depending on the video signals to be transmitted. The television channels containing a data stream of multiplexed video signals may be transmitted over a standard cable television distribution network, or direct broadcast satellite transmission system.

A receiver 106 receives one or more programming channels, some or all containing a multiplexed data stream of video signals or non-multiplexed digital video signals, and in conjunction with a signal selector, selects a particular data channel/data stream for playback, then selects a particular video signal from the data stream's multiplexed signal, and finally expands the video signal, if necessary, for playback to a television monitor 110.

In one embodiment, a user selects a channel for viewing. The digital channel may include primary video and audio signals that represent a regular television program. When an advertisement appears in the primary video and audio signal, the receiver 106 determines whether the advertisement has already been played an optimum number of times. If this is the case, the receiver 106 switches to secondary video and audio signals that include an alternative advertisement.

Preferably, the switch to the secondary advertisement is seamless or imperceptible by the user. This can be accomplished by programming a slight imperceptible delay during a switch to an alternative advertisement to allow the expansion algorithm an opportunity to adjust to the rapid change from one video signal to another.

During the delay, previously obtained video information is displayed while the interactive system locates, receives, demultiplexes, decompresses, decodes, and processes the new video signal. This allows the interactive system to switch to the new video signal without flicker or distortion appearing on the TV screen, i.e., a seamless switch.

Different methods to achieve this seamless switching are known and explained in U.S. Pat. No. 6,215,848, the disclosure of which is hereby incorporated by reference.

Information concerning an advertisement including, for example, identification of the advertisement and the optimum number of views for the advertisement can be inserted into a variety of broadcast streams using any number of different formats. For example, the advertisement information can be formatted into MPEG-2 private sections and MPEG-2 transport packets. MPEG compression is a set of methods for compression and decompression of full motion video images that uses interframe and intraframe compression techniques. Alternatively, the video and audio can be formatted according to IPTV formats.

It will also be recognized that the advertisement information can be broadcast using a number of other digital and analog formats. For example, the packets could be inserted into the vertical blanking interval (VBI) of an analog broadcast stream, the horizontal blanking interval, secondary audio channels, SAP, etc.

The control of the playback of an advertisement can be accomplished at the head end, for example an advertisement distribution server, which can be located at broadcast station 100 or at a separate location, instead of at the receiver 106. For example, the receiver 106 may be connected to an advertisement distribution server, which controls the play of advertisements to several receivers 106. Such a connection can be made using any known connection including an internet or conventional telephone system connection. When an advertisement is played, the receiver 106 notifies the server of the play and the server determines whether the advertisement has been viewed an optimum number of times.

The advertisement distribution server can distribute advertisements to the receivers 106 connected to it either directly using the direct connection to the receiver or through a broadcast system that delivers regular television programming. For example, the advertisement distribution server may simply send an indication through the direct connection to the receiver notifying the receiver that it should display an alternative advertisement that can be found in the broadcast stream.

Figure 2:
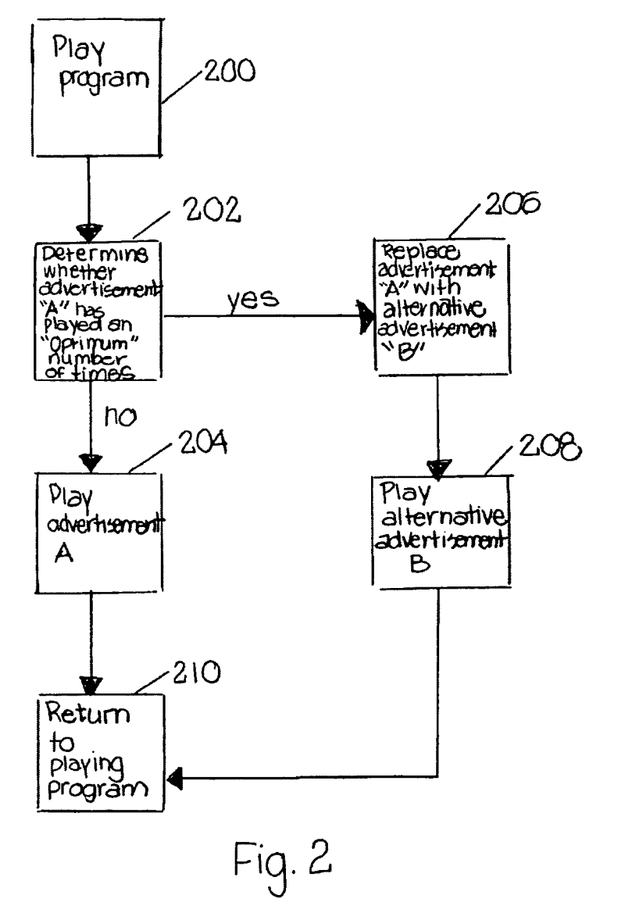
FIG. 2 is flow diagram that shows a method to provide programming with viewer optimized advertisements.
Figure 3:
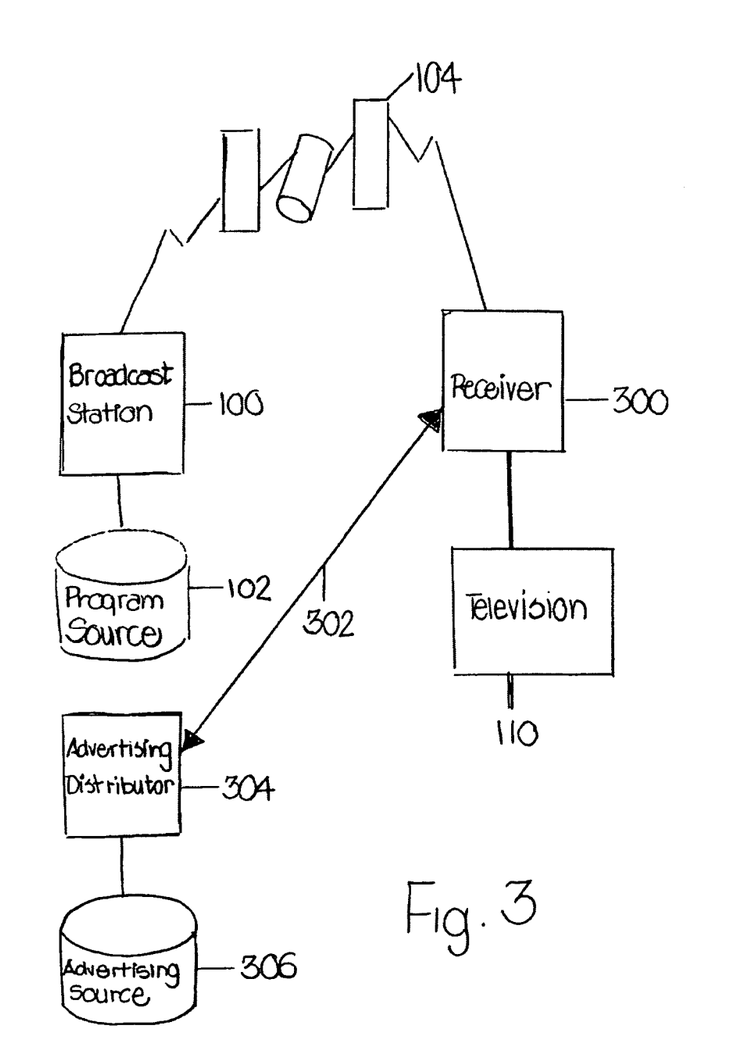
FIG. 3 is an alternative configuration of a television system.
Figure 4:
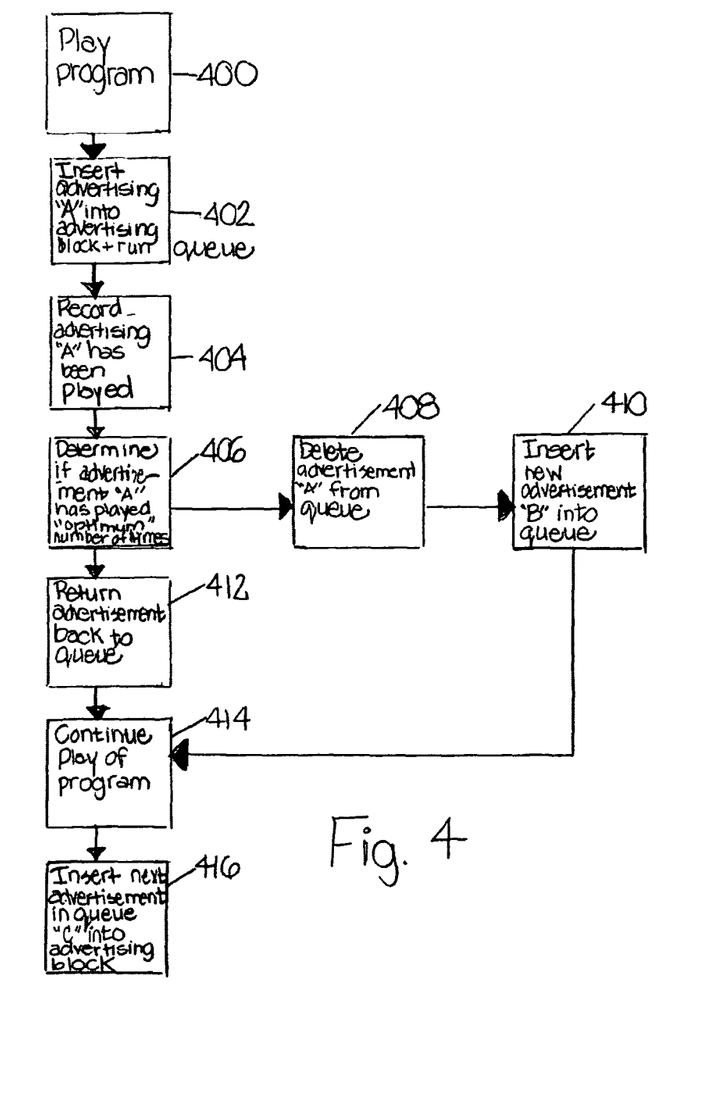
FIG. 4 is a flow diagram of how advertisements can be inserted into a program from a queue.

The operation of the television system will be better understood with reference to FIGS. 2-4.

FIG. 2 is a flow diagram that shows one embodiment of how the television system in FIG. 1 can be utilized to provide programming with viewer optimized advertisements. In FIG. 2, a program received from broadcast medium 104, or alternatively played from local storage device 108, is displayed on television 110 at 200. The programming includes advertising blocks. Preferably, these advertising blocks include advertising information that describes the advertising block.

The advertising information can include, for example, when the advertising block appears in the program, an identification of a specific advertisement currently in the block, and an identification of the type of product being advertised and the length of the block.

In one embodiment, client system 112 includes a memory for storing data concerning what advertisements have been played to a viewer. The information stored can, for example, be in the form of a table or other data format. Preferably, the client system 112 stores what advertisements have been played before and how many times they have played. In addition, or in the alternative, the system may store what products, services or subject has been advertised previously or in addition to the specific advertisements have been played to a viewer.

Each time an advertisement appears in a block, the client system 112 determines whether the advertisement has been shown to a viewer an optimum number of times. If the advertisement has not been played an optimum number of times, the advertisement in the program is allowed to play at 204. At 204, the client system 112 also records that the advertisement has played and the number of views is increase by one. Information about the playback can also be recorded. For example, the receiver can record whether the complete advertisement was played or whether the user switched the channel or shut off the television during playback. This playback information can be utilized in determining the optimum number of times for playback.

If client system 112 determines that the advertisement has already been played an optimum number of times, the advertisement is replaced with an alternative advertisement at 206 which is then played on the television at 208. Preferably, the switch from the regular programming to the alternative program is not perceptible by the viewer. Once the advertisement is played at 204 or the alternative advertisement is played at 208, the user is returned to the regular program at 210.

The alternative advertisement may be from a variety of sources. For example, alternative advertisements may be stored within the client system in a local storage device. Alternatively, the alternative advertisement may be part of the same television broadcast as a separate video and audio signal.

By delivering the alternative advertisements along with the regular television program, an advertiser can provide an alternative advertisement for another product or service provided by the advertiser. In this manner, the advertiser can maximize the effect of their advertising. If the alternative advertisement is provided from client system 112, the advertiser is limited in the choice of alternative advertisements that can be provided to the user to those advertisements in local storage 108.

FIG. 3 is an alternative configuration of the television system in FIG. 1. In FIG. 3, receiver 300 is connected to advertising distributor 304. The connection to advertising distributor 304 is preferably through a two way connection. This connection could be made through the cable backchannel or through any network such as the Internet, other network, or dedicated lines.

In a two-way embodiment, the various signals which comprise the advertisement may be switched at the head end rather than at the receiver. This embodiment may include, for example, an internet connection or a conventional telephone system connection that allows communication from the receiver to a server.

The receiver 300 can provide information on the advertisements that have been viewed on television 110 directly to advertising distributor 304. The change from one advertisement to another can then be made directly by advertising distributor 304 and delivered to receiver 300 either through connection 302 or through broadcast medium 104. For example, the advertising distributor 304 may target an advertisement to receiver 300 using a conditional access system or other targeted broadcast system to target a particular receiver 300.

FIG. 4 is a flow diagram of how advertisements can be inserted into a program from a queue. When the advertisement has been played an optimum number of times, the advertisement is removed from the queue and replaced with another advertisement.

The system and queue can be located at the head-end if a communication line from the client system to the head end is established. In this embodiment, the head-end is notified when the client system is on and is playing an advertisement in the queue and the head-end is able to deliver custom content directly to the client system. Such a communication line may include, for example, an internet connection or cable backchannel. Alternatively, the queue can be located locally at the viewers system. If the queue is locally, preferably, the viewer's system includes a local storage device containing the advertisements in the queue.

In FIG. 4 a regular program, such as a news program, sporting event or movie is played at 400. During an advertising break in the program, advertisement A, which is the next advertisement in a queue of advertisements, is played at 402. The advertisement play system then notes that the advertisement has been played at 404. After advertisement A has been played, the system determines whether advertisement A has been played an optimum number of times at 406. If the advertisement has been played an optimum number of times, the advertisement is removed from the queue at 408 and replaced at the end of the queue with a new advertisement B at 410 and play of the regular program is continued at 412.

If advertisement A has not been played at optimum number of times, advertisement A is returned to the end of the queue at 412 and play of the regular program is continued at 412. During the next advertisement break in the regular program, the next advertisement in the queue, advertisement C, is played.

Figure 5A:
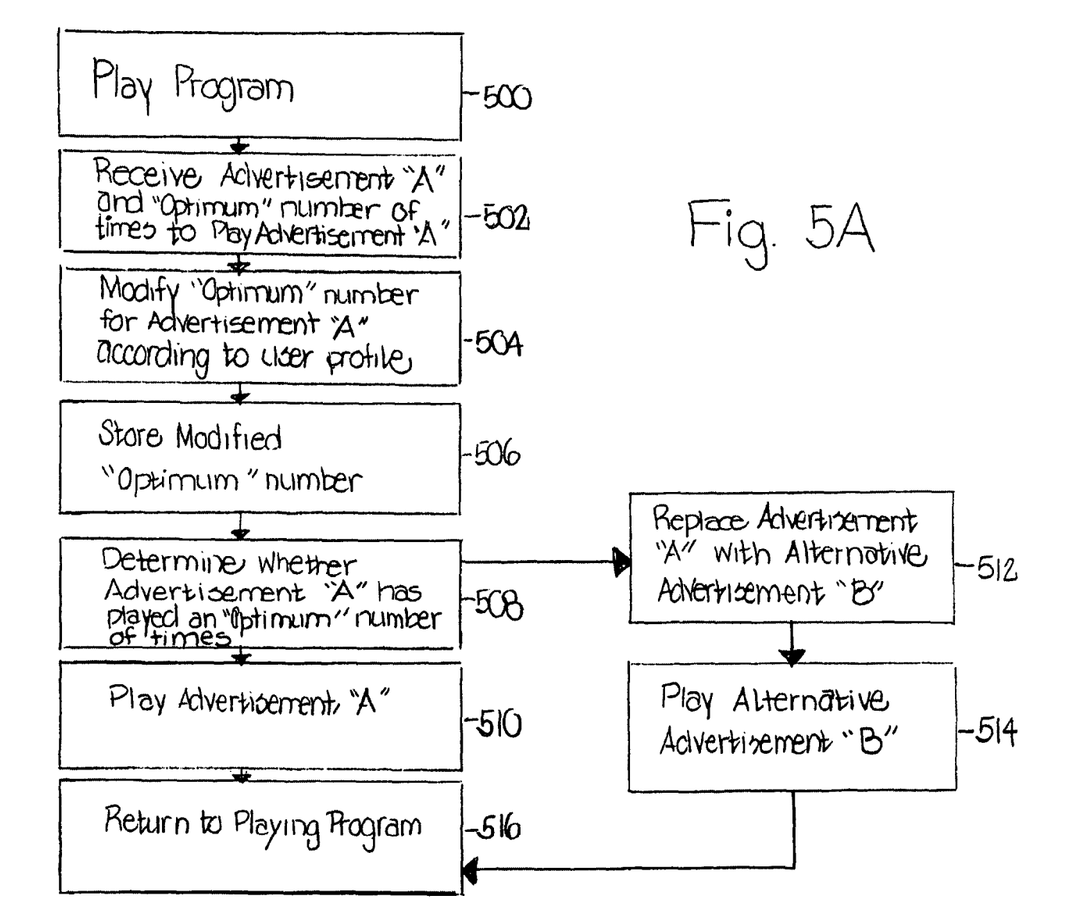
FIG. 5A is a flow diagram of how an optimum number can be modified according to a user profile; and In FIG. 5B is a flow diagram of how an optimum number can be modified according to user interaction.
Figure 5B:
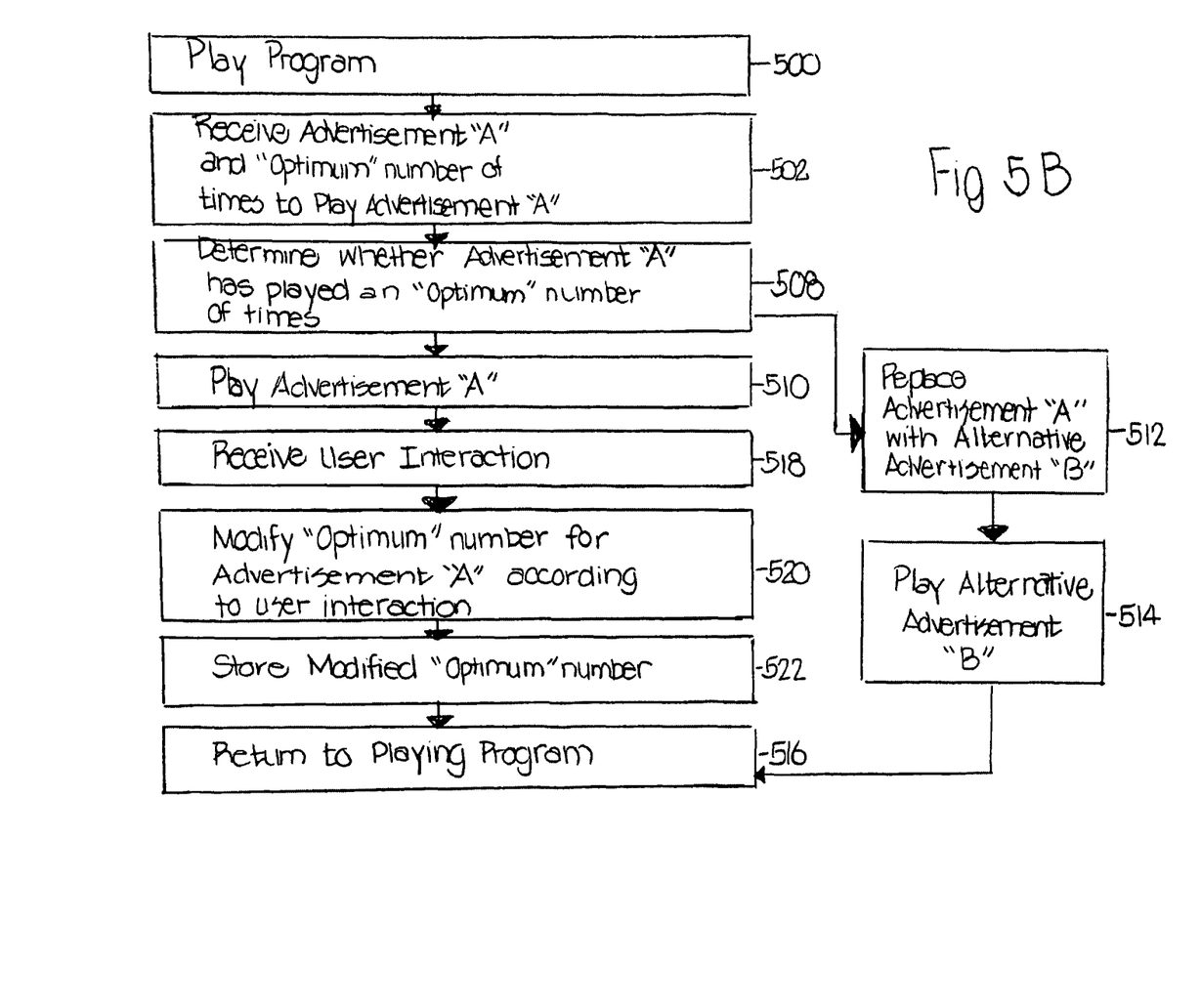

FIGS. 5A and 5B are flow diagrams of two embodiments of how the optimum number of times an advertisement is played can be modified according to a user profile or user interaction using the system described in FIG. 1.

In FIG. 5A an optimum number is modified according to a user profile. In FIG. 5A a program received from broadcast medium 104 is displayed on television 110 at 500. The receiver also receives an advertisement "A" and information that describes advertisement "A" at 502. The information that describes the advertisement includes an identification of the specific advertisement currently in the block, and an identification of the type of product being advertised and the length of the block. Preferably, the advertisement information also includes an "optimum" number of times to play the advertisement. Alternatively, a default value for the "optimum" number of times to play the advertisement can be assigned by client system 112.

After receiving advertisement "A" and information describing the advertisement at 502, the client system determines whether any modification to the "optimum" number of times to play the advertisement should be made according to the user profile at 504. Modifications to the optimum number can be based on, for example, age, income, geographic location, interests, or many other things. For example, the user profile may indicate that the user has several children. In such a situation, the optimum number of times to play an advertisement concerning toys for children could be increased. Alternatively, if the user profile indicates that the user does not have any children, the optimum number could be decreased or even set to zero.

Once the optimum number for playing advertisement "A" is modified at 504 according to the user profile, the modified user profile is stored by client system 112 at 506. Client system 112 then determines whether advertisement "A" has played an optimum number of times at 508. If advertisement "A" has not been played an optimum number of times, advertisement "A" is played at 510 before returning to playing the program at 516.

If advertisement "A" has already been played the optimum number of times, advertisement "A" is replaced with alternative advertisement "B" at 512. Alternative advertisement "B" is then played at 514 before the system returns to playing the program at 516.

In FIG. 5B an optimum number is modified according to user interaction. As in FIG. 5A, a program received from broadcast medium 104 is displayed on television 110 at 500. The receiver also receives an advertisement "A" and information that describes advertisement "A" at 502. Preferably, the information that describes advertisement "A" includes the optimum number of times to play the advertisement.

Client system 112 then determines whether advertisement "A" has played an optimum number of times at 508. If the advertisement has not been played an optimum number of times, the advertisement is played at 510 before returning to playing the program at 516. During the play of the advertisement "A" the client system 112 monitors user interactions with the client system 112. These interactions can include, for example, turning off the client system 112, changing the channel, or turning the volume up or down. In response to the user interactions, the client system 112, modifies the optimum number of times to play advertisement "A" at 518.

For example, if client system 112 monitors that the volume has increased during the play of the advertisement or that the client system has remained on and tuned to the channel in which advertisement "A" is playing throughout the advertisement, the optimum number may be increased. In comparison, if the playback of advertisement "A" is interrupted during playback, for example by the channel being changed or by client system 112 being changed, the optimum number of times may be decreased.

If advertisement "A" has already been played the optimum number of times, advertisement "A" is replaced with alternative advertisement "B" at 512 and alternative advertisement "B" is played at 514 before returning to playing the program at 516.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

Other embodiments and uses of the invention will be apparent to those skilled in the art from consideration of the specification and practice of the invention disclosed herein. All references cited herein, including all U.S. and foreign patents, patent applications, all publications and other documentary materials, are specifically and entirely hereby incorporated by reference.

What is claimed is:

1. A method of modifying an optimum number of times to play a first advertisement, the method comprising:
   by operation of a client device, receiving the optimum number of times for playing the first advertisement to a viewer, the optimum number being received in a data stream that provides regular programming that comprises the first advertisement, the optimum number being modifiable based on one or more actions of the viewer watching the regular programming, the one or more actions of the viewer including at least one of turning off the client device during play of the first advertisement or changing a volume of the first advertisement during play of the first advertisement;
   by operation of the client device, playing the regular programming that comprises the first advertisement;
   by operation of the client device comprising a processor, modifying the optimum number in response to detection of the one or more actions of the viewer by the client device;
   by operation of the client device comprising the processor, determining whether the first advertisement has been played the modified optimum number of times by the client device;
   by operation of the client device, playing the first advertisement if the first advertisement has been played less than the modified optimum number of times by the client device; and
   by operation of the client device playing a second advertisement if the first advertisement has been played the modified optimum number of times by the client device.

2. The method of claim 1, further comprising recording the number of times the first advertisement has played.

3. The method of claim 1, wherein the optimum number of times is a constant.

4. The method of claim 1, wherein the optimum number of times is a viewing frequency.

5. The method of claim 1, wherein the optimum number of times is dependent upon one or more viewing habits of the viewer.

6. The method of claim 1, wherein the optimum number of times is dependent upon a user profile.

7. The method of claim 1, wherein the viewer can indicate when the optimum number of times has been reached.

8. The method of claim 1, wherein the regular television programming, the first advertisement and the second advertisement are broadcasted in digital format.

9. The method of claim 1, wherein the second advertisement is stored on the client device prior to playing.

10. The method of claim 1, wherein the second advertisement is broadcasted to the client device.

11. The method of claim 1, wherein:
    the one or more actions of the viewer include turning off the client device during play of the first advertisement; and
    the modifying the optimum number of times to play the first advertisement includes reducing the optimum number.

12. The method of claim 1, wherein:
    the one or more actions of the viewer include leaving the client device on during play of the first advertisement; and
    the modifying the optimum number of times to play the first advertisement includes increasing the optimum number.

13. The method of claim 1, wherein:
    the one or more actions of the viewer include increasing the volume of the first advertisement during play of the first advertisement; and
    the modifying the optimum number of times to play the first advertisement includes increasing the optimum number.

14. The method of claim 1, wherein:
    the one or more actions of the viewer include decreasing the volume of the first advertisement during play of the first advertisement; and
    the modifying the optimum number of times to play the first advertisement includes decreasing the optimum number.

15. A method of modifying an optimum number of times to play a first advertisement, the method comprising:
    by a client device:

receiving the optimum number of times for playing a first advertisement to a viewer, the optimum number of times being received in a data stream that provides regular programming that comprises the first advertisement, the optimum number of times being modifiable based on one or more actions of the viewer watching the regular programming, the one or more actions of the viewer including at least one of turning off the client device during play of the first advertisement or changing a volume of the first advertisement during play of the first advertisement;

playing the data stream including the regular programming that comprises the first advertisement;

modifying the optimum number in response to detection of the one or more actions of the viewer b the client device;

determining whether the first advertisement played from a first video source has been played the modified optimum number of times by the client device: and replacing the first advertisement with a second advertisement based on the first advertisement having been played the modified optimum number of times by the client device.

16. The method of claim 15, wherein the first video source comprises a digital broadcast source.

17. The method of claim 16, wherein the digital broadcast source is selected from the group consisting of satellite, digital cable, wireless, and the Internet.

18. The method of claim 15, wherein the first video source comprises a local storage device.

19. The method of claim 15, wherein the second advertisement is provided by a second video source.

20. The method of claim 19, wherein the second video source comprises a local storage device.

21. The method of claim 15, wherein the second advertisement is provided by the first video source.

22. The method of claim 15, further comprising recording a number of times the first advertisement has played.

23. The method of claim 15, further comprising establishing a two-way communication link to an advertising distributor.

24. The method of claim 23, wherein the second advertisement is provided over the two-way communication link.

25. The method of claim 23, wherein the advertising distributor is notified when the first advertisement has been viewed by the viewer over the communication link.

26. The method of claim 15, further comprising monitoring viewing habits of the viewer to further modify the optimum number of times.

27. The method of claim 15, further comprising further modifying the optimum number of times using a user profile.

28. A method of a primary advertisement to be played an optimum number of times, the method comprising:

by operation of a server, determining the optimum number of times for playing the primary advertisement to a viewer, the optimum number being insertable into a data stream that provides regular programming that comprises the primary advertisement, the optimum number being modifiable based on one or more actions of the viewer watching the regular programming, the one or more actions of the viewer including at least one of turning off a client device during play of the primary advertisement or changing a volume of the primary advertisement during play of the primary advertisement;

by operation of the server comprising a processor, modifying the optimum number in response to detection of the one or more actions by the server;

by operation of the server, distributing to the client device among multiple client devices a data stream comprising the regular programming, the primary advertisement, and an alternative advertisement; and by operation of the server, distributing advertising information inserted in the data stream, wherein the advertising information comprises the modified optimum number of times to play the primary advertisement distributed by the server.

29. The method of claim 28, wherein the broadcast stream is a digital broadcast stream.

30. The method of claim 28, wherein the client device plays the primary advertisement the optimum number of times and then plays the alternative advertisement.

31. The method of claim 28, wherein the advertising information comprises of at least one of; a time that the primary advertisement appears in the regular programming, an identification of the primary advertisement, or an identification of a product or service type described by the primary advertisement.

32. A method of modifying a predetermined frequency to play a first advertisement, the method comprising:

by operation of a device playing a data stream including regular programming that comprises the first advertisement;

by operation of the device, determining whether the first advertisement should be played to a specific viewer according to a predetermined frequency for the first advertisement, the predetermined frequency being modifiable based on one or more actions of the specific viewer watching the regular programming, the one or more actions of the viewer including at least one of turning off the device during play of the first advertisement or changing a volume of the first advertisement during play of the first advertisement:

by operation of the device comprising a processor, modifying the predetermined frequency in response to detection of the one or more actions of the specific viewer;

by operation of the device, playing the first advertisement if it is determined that the first advertisement should be played to the specific viewer according to the modified predetermined frequency for the first advertisement; and by operation of the device, playing a second advertisement to the specific viewer if it is determined that the first advertisement should not be played according to the modified predetermined frequency for the first advertisement.

33. The method of claim 32, wherein the predetermined frequency is a constant.

34. The method of claim 32, wherein the predetermined frequency is dependent upon one or more viewing habits of the specific viewer.

35. The method of claim 32, wherein the predetermined frequency is dependent upon a user profile.

36. A computer-readable hardware storage device having embedded therein a set of instructions which, when executed by one or more processors of a client device causes at least one of the one or more processors to execute operations comprising:

by operation of the client device, receiving the optimum number of times for playing a first advertisement to a viewer, the optimum number being received in a data stream that provides regular programming that comprises the first advertisement, the optimum number being modifiable based on one or more actions of the viewer watching the regular programming, the one or more actions of the viewer including at least one of turning off the client device during play of the first advertisement or changing a volume of the first advertisement during play of the first advertisement;

by operation of the client device, playing the regular programming that comprises the first advertisement;

by operation of the client device, modifying the optimum number in response to detection of the one or more actions of the viewer;

by operation of the client device, determining whether the first advertisement has been played the modified optimum number of times by the client device;

by operation of the client device, playing the first advertisement if the first advertisement has been played less than the modified optimum number of times by the client device; and by operation of the client device, playing a second advertisement if the first advertisement has been played the modified optimum number of times by the client device.

37. A computer-readable hardware storage device having embedded therein a set of instructions which, when executed by one or more processors of a server causes at least one of the one or more computer processors to execute operations comprising:

by operation of a server, determining the optimum number of times for playing the primary advertisement to a viewer, the optimum number being insertable into a data stream that provides regular programming that comprises the primary advertisement, the optimum number being modifiable based on one or more actions of the viewer watching the regular programming, the one or more actions of the viewer including at least one of turning off a client device during play of the primary advertisement or changing a volume of the primary advertisement during play of the primary advertisement;

by operation of the server, modifying the optimum number in response to detection of the one or more actions by the server;

by operation of the server, distributing to the client device among multiple client devices the data stream comprising the regular programming, the primary advertisement, and an alternative advertisement; and by operation of the server, distributing advertising information inserted in the data stream, wherein the advertising information comprises the modified optimum number of times to play the primary advertisement distributed by the server.

38. A computer-readable hardware storage device having embedded therein a set of instructions which, when executed by one or more processors of a device, causes at least one of the one or more computer processors to execute operations comprising:

by operation of the device, receiving a predetermined frequency for playing a first advertisement for a viewer, the predetermined frequency being received in a data stream that provides regular programming that comprises the first advertisement, the predetermined frequency being modifiable based on one or more actions of the viewer watching the regular programming, the one or more actions of the viewer including at least one of turning off the client device during play of the first advertisement or changing a volume of the first advertisement during play of the first advertisement;

by operation of the device, playing the data stream including the regular programming that comprises the first advertisement;

by operation of the device, modifying the predetermined frequency in response to detection of the one or more actions of the viewer;

by operation of the device, determining whether the first advertisement should be played according to the modified predetermined frequency for the first advertisement;

by operation of the device, playing the first advertisement if it is determined that the first advertisement should be played according to the modified predetermined frequency for the first advertisement; and by operation of the device, playing a second advertisement if it is determined that the first advertisement should not be played according to the modified predetermined frequency for the first advertisement.

39. A method comprising:

by operation of a device comprising one or more computer processors, playing a data stream including regular programming that comprises a first advertisement;

by operation of the device, determining an optimum number of times for playing the first advertisement to a specific viewer, the optimum number being modifiable based on one or more actions of the specific viewer watching the regular programming, the one or more actions of the specific viewer including at least one of turning off the device during play of the first advertisement or changing a volume of the first advertisement during play of the first advertisement;

by operation of the device comprising the one or more computer processors, modifying the optimum number in response to detection of the one or more actions of the specific viewer;

by operation ot the device determining whether the first advertisement has been played the modified optimum number of times to the viewer by the device;

by operation of the device, playing the first advertisement if the first advertisement has been played less than the modified optimum number of times to the viewer by the device; and by operation of the device, playing a second advertisement if the first advertisement has been played the modified optimum number of times to the viewer by the device.

* * * * *

UNITED STATES PATENT AND TRADEMARK OFFICE
CERTIFICATE OF CORRECTION

PATENT NO. : 9,037,482 B2  
APPLICATION NO. : 11/376307  
DATED : May 19, 2015  
INVENTOR(S) : Matthew Huntington Page 1 of 1

It is certified that error appears in the above-identified patent and that said Letters Patent is hereby corrected as shown below:

In the claims

In column 10, line 15, in Claim 1, after "device", insert --,--, therefor

In column 11, line 15, in Claim 15, delete "b" and insert --by--, therefor

In column 11, line 18, in Claim 15, delete "device:" and insert --device;--, therefor In column 11, line 47, in Claim 26, delete "15," and insert --15,--, therefor In column 12, line 16, in Claim 31, delete "of;" and insert --of:--, therefor In column 12, line 23, in Claim 32, after "device", insert --,--, therefor In column 12, line 35, in Claim 32, delete "advertisement:" and insert --advertisement;--, therefor In column 14, line 43, in Claim 39, delete "ot" and insert --of--, therefor In column 14, line 43, in Claim 39, after "device", insert --,--, therefor Signed and Sealed this  
Twentieth Day of October, 2015

Michelle K. Lee  
*Director of the United States Patent and Trademark Office*